United States Patent [19]

Vallins

[11] 4,127,850
[45] Nov. 28, 1978

[54] SCANNING DISPLAY APPARATUS

[75] Inventor: David J. Vallins, Cheltenham, England

[73] Assignee: Smiths Industries Limited, London, England

[21] Appl. No.: 768,663

[22] Filed: Feb. 14, 1977

Related U.S. Application Data

[63] Continuation-in-part of Ser. No. 618,662, Oct. 1, 1975.

[30] Foreign Application Priority Data

Sep. 3, 1976 [GB] United Kingdom ............... 36668/76

[51] Int. Cl.² ............................................. G06F 3/14
[52] U.S. Cl. .......................... 340/324 A; 340/27 NA
[58] Field of Search ..... 340/27 NA, 27 AT, 324 AD; 343/5 EM, 108 SM; 353/28, 14; 315/386

[56] References Cited

U.S. PATENT DOCUMENTS

| 3,484,647 | 12/1969 | McGuinness | 315/386 |
|---|---|---|---|
| 3,520,994 | 7/1970 | McAfee et al. | 340/27 AT |
| 3,686,626 | 8/1972 | Bateman et al. | 340/27 NA |
| 3,711,826 | 1/1973 | LaRussa | 340/27 NA |
| 3,812,491 | 5/1974 | Barraclough et al. | 340/324 AD |
| 3,824,535 | 7/1974 | Rover, Jr. | 340/27 NA |
| 3,894,292 | 7/1975 | Wilkinson et al. | 340/324 AD |

Primary Examiner—Marshall M. Curtis
Attorney, Agent, or Firm—Pollock, Vande Sande & Priddy

[57] ABSTRACT

A head-up display involving display of pitch-bar symbols in the line of sight of an aircraft pilot is generated using raster scanning of a cathode-ray-tube screen and bright-up in accordance with stored information relating to the wings-level or other datum attitude of the aircraft. Variation of the pitch-bar mapping in the display area to follow change of attitude of the aircraft is made through transformation in accordance with pitch and bank angles applied to the point-by-point progression of the raster scan, and the visual staircase effect of symbols inclined to the line-scan is reduced by controlled variation in brightness from point to point. Each point $(x_d, y_d)$ in the progression of the scan through the display area is mapped back incrementally into the corresponding point $(x_p, y_p)$ of the stored datum-attitude map, through a transformation in rotation dependent on the bank angle $\phi$. Computation of $x_p$ involves summation of discrete signals representative of $x_d\cos\phi$ and $y_d\sin\phi$, and of $y_p$ involves summation of discrete signals representative of $-x_d\sin\phi$ and $y_d\cos\phi$. The eight most-significant bits of the eleven-bit computed values of $x_p$ and $y_p$ are used to read out four bits stored in respect of the point $(x_p, y_p)$ to define the brightness of that point and three immediately-adjoining points in the datum-attitude mapping. Brightness-weightings applied to the four digits respectively are derived from read-only memories in accordance with the three least-significant bits of the computed values of $x_p$ and $y_p$, and the four bits so weighted are added together to provide the bright-up video input to the cathode-ray tube for the point $(x_d, y_d)$.

14 Claims, 8 Drawing Figures

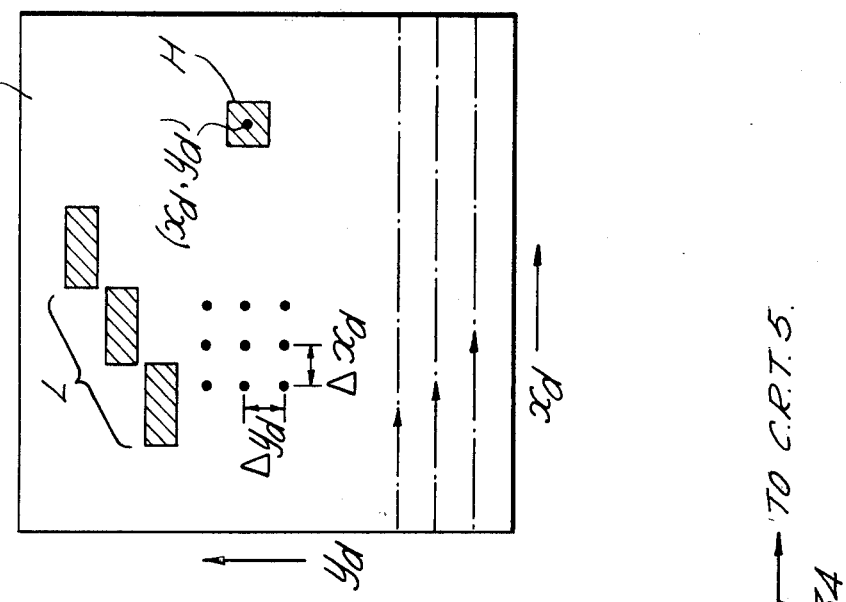
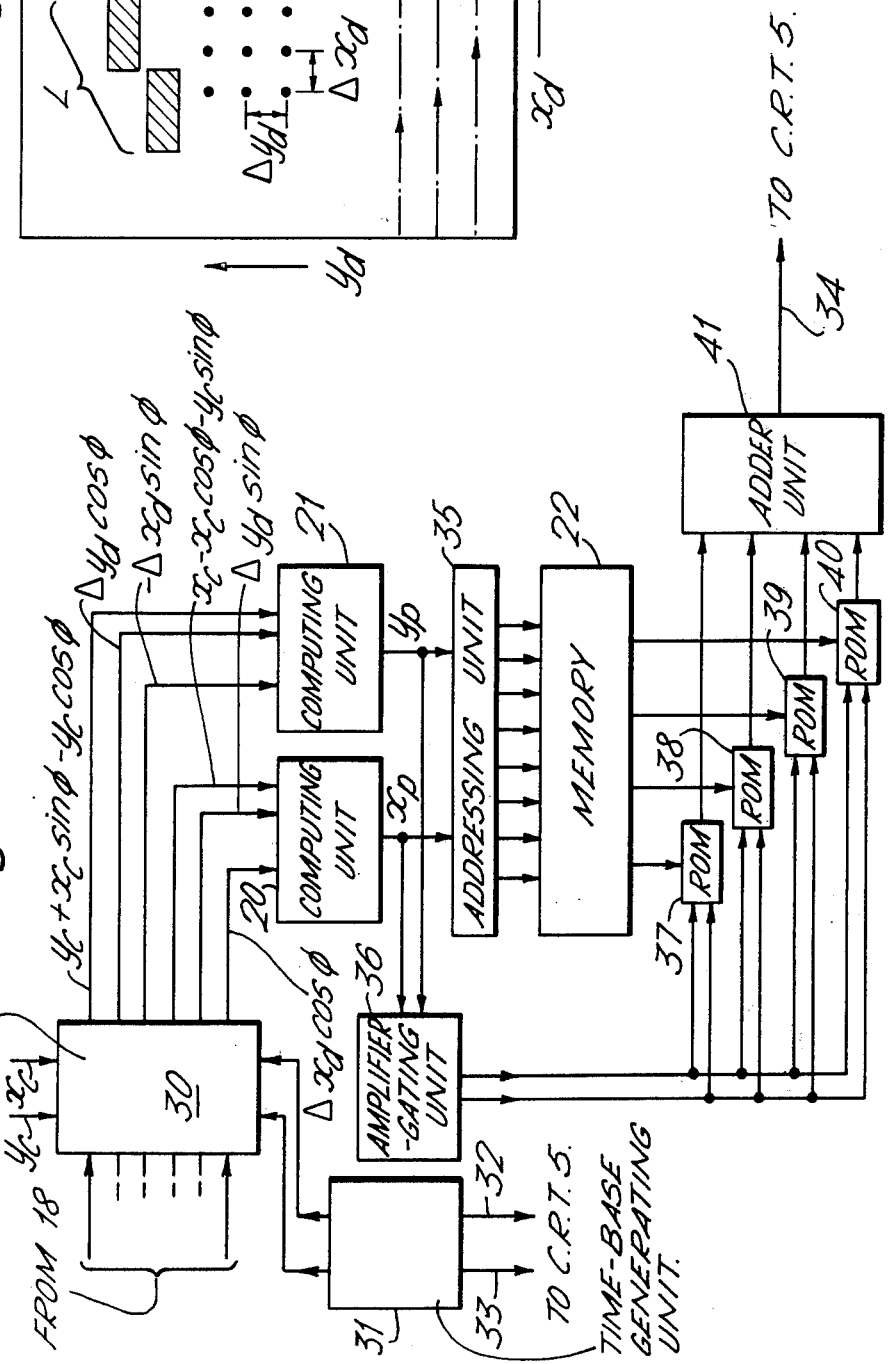

SCANNING DISPLAY APPARATUS

CROSS-REFERENCE TO RELATED APPLICATION

This patent application is a continuation-in-part application based on my U.S. patent application Ser. No. 618,662, filed Oct. 1, 1975.

BACKGROUND OF THE INVENTION

This invention relates to display systems.

The invention is particularly, though not exclusively, concerned with head-up display systems for aircraft, that is to say, with display systems of the kind in which the display is projected onto a partially-transparent reflector in the line-of-sight of a pilot or other crew member of the aircraft so as to provide an image of the display against the background of the external scene through the aircraft windscreen. The display is normally provided in such a system by a cathode-ray tube and involves symbols that in the image seen in the partially-transparent reflector, are positioned against the background of the external scene to give indication of such factors as aircraft attitude and flight-path.

The symbols in the latter context conventionally include one or more lines that are required to be maintained superposed upon the horizon, or otherwise maintained horizontal, in the external scene viewed through the reflector, irrespective of manoeuvre of the aircraft. To this end the disposition of the one or more 'horizon' lines in the reflector is varied in tilt and lateral displacement in accordance with control signals that are indicative of change of aircraft attitude in bank and pitch respectively.

There are circumstances in which it is desirable to provide the cathode-ray-tube display using a raster or other point-by-point scan, as distinct from a cursive technique in which the cathode-ray beam is caused to trace out the symbol directly. This applies especially where pictorial information as derived, for example, from a television or infra-red camera, is to be included in the display image superposed on the external scene as viewed by the pilot or other crew member. In such circumstances the one or more horizon lines and other symbology may be generated by modulation of signals in accordance with stored information relating to the mapping of the symbology in the display area, and application of these signals to the cathode-ray tube as bright-up signals appropriately synchronized to the raster or other scan.

Variation in the disposition of the symbols within the display area, and in particular the tilting and lateral displacement of the one or more horizon lines, required with manoeuvre of the aircraft, can be achieved by appropriate modification of the stored mapping. Such modification, which is performed in particular under control of signals dependent on changes in bank and pitch attitude of the aircraft, will normally necessitate the provision of substantial additional processing and storage capacity. A digital system for effecting tilting and lateral displacement of an artificial-horizon line in a cathode-ray-tube display utilizing raster scan, is described in U.S. Pat. No. 3,925,765 issued to Berwin et al on Dec. 9, 1975.

Where a raster scan is used, variation of the angle of tilt of a line in the display is usually accompanied by change in the degree of clarity or definition of the line concerned, the loss of definition being in general larger the smaller the angle of inclination from alignment with the line-scan of the raster. A staircase or notched appearance is usually experienced and slight change in the angle of tilt can readily result in disconcerting movement and even oscillatory, back-and-forth break up, of the line representation.

A significant increase in the number of line scans in the raster together with a corresponding increase in the definition with which the display symbology is pictured, would serve to reduce the visual staircase or notched effect. But there is usually in practice a standard raster to be used (for example 512- or 625-line), and an economic or space limit on the amount of information storage and processing that can be provided for picture definition. Furthermore, the signals for display of the symbology are conveniently and more economically generated using digital techniques, so the essentially discrete-element composition of the symbol representations adds to the disjointed visual effect. The display representation of each 'horizon' line for example, is in essence generated by bright-up of successive elements across the cathode-ray-tube screen, and whereas these elements for an untilted line are joined up with one another in one series along one or more horizontal scan lines, the tilted-line representation is formed by disjointed series on successive, vertically-spaced scan lines of the raster.

BRIEF SUMMARY OF THE INVENTION

It is one of the objects of the present invention to provide a form of display system by which the requirement for extensive signal processing and storage capacity can be avoided, or at least the scale of the requirement can be significantly reduced.

It is another of the objects of the present invention to provide a display method and a display system which may be used to achieve an improved representation, and which may be used more especially to reduce the visual staircase or notched effect occurring in display symbology.

According to one aspect of the present invention there is provision of a display system wherein it is arranged that a display image is provided in a display area in accordance with signals which are synchronized to point-by-point scanning of that area and which are derived in accordance with stored information that relates to a datum mapping of the image within the display area, and wherein means is provided for selectively varying the mapping of the image within the display area, said means being arranged to perform a transformation process dependent on the selected mapping in respect of the successive points of said scan such as thereby to derive indentification of the corresponding points of the stored datum-mapping, and to derive said signals in accordance with the information stored in respect of the successively-identified points.

With this display system the signal appropriate to any point in the scanning of the display area is derived by determining the identity of the corresponding point in the datum mapping, and by then reading out or otherwise deriving from the stored information the signal applicable to this identified point. The display area is effectively mapped back point by point into the datum mapping. The signals applicable throughout the scan may therefore be derived from the stored information as the scan progresses point by point. Thus there is no requirement for the provision of additional storage capacity as would be the case if the point-by-point information for the display required, were to be derived by transformation applied to the datum-mapping information.

According to another aspect of the present invention there is provision of a method for providing a display wherein it is arranged that successive elements of the display area are selectively brighted up during raster or other scanning of that area in accordance with signals that serve to define those of said elements which are to be occupied by symbology to be displayed, and wherein it is arranged that the degree of bright-up applied in each of those individual elements is varied in dependence upon the extent to which the symbology as defined by said signals, occupies that element.

The present invention in the latter aspect recognizes that for a given raster scan where the display is to be generated by selective bright-up of successive elements of the display area during that scan, much of the undesired staircase or other disconcerting visual effects usually experienced can be obviated, or at least substantially reduced, by modulating the degree to which bright-up is applied. More specifically, where according to the signal definition of the symbology, only part of any display-area element would ideally be brighted up, the normal course prior to this invention would be to bright up the whole element fully since provision for bright up of only a fractional part of the element would be difficult and costly to implement. The present invention however enables an approximation to the ideal situation to be achieved readily, by providing that the brightness or degree of bright up applied to any such element is dependent on the fractional part that would ideally have been fully brighted up. The degree of bright up might be related linearly to the areal fraction of the element that would ideally be fully brighted up, but in general it will be found that the relationship that serves to prove most satisfactory visually is non-linear and can best be determined in any particular case, by trial.

Although the present invention has been considered above in the light of specific reference to display representation of simple straight lines, it is to be understood that the invention is nonetheless applicable in a similar manner to reduction of undesirable visual effects in other symbology. Furthermore, the invention is applicable to display systems generally and is not confined to specific application in head-up display systems for aircraft, though it is especially applicable in such context.

A display system in accordance with the present invention will now be described, by way of example, with reference to the accompanying drawings.

BRIEF DESCRIPTION OF THE DRAWINGS

FIG. 5 is a schematic representation of of electrical-system configuration incorporating the electrical units of FIG. 4 and appropriate for video-signal generation in the display system of FIG. 1;

FIG. 6 is illustrative of display of a line inclined to the raster scanning of the display area.

DETAILED DESCRIPTION

Figure 1:
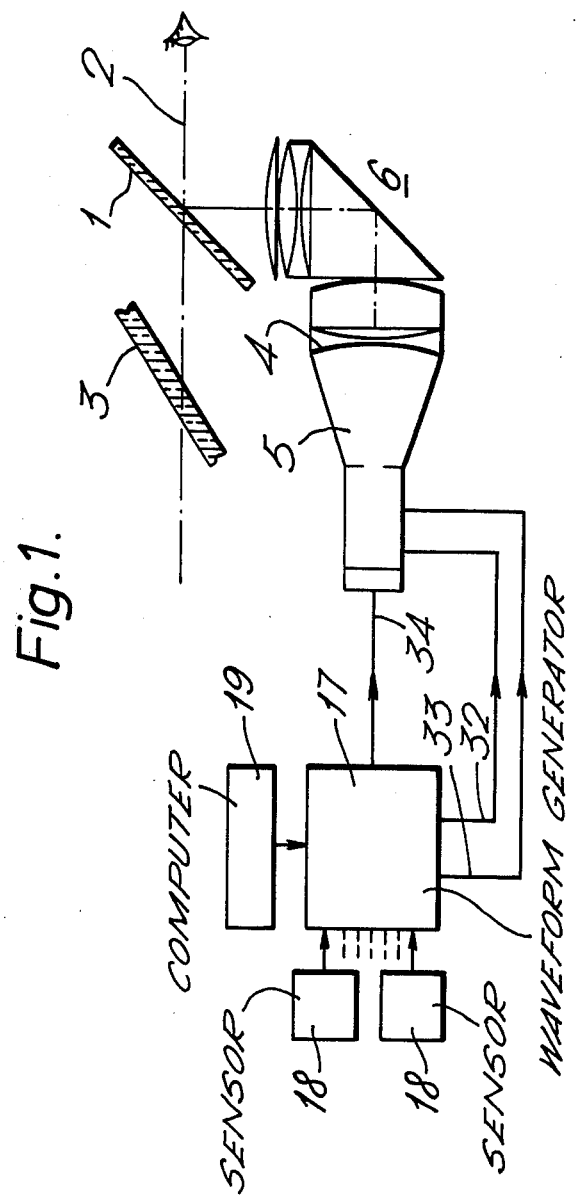
FIG. 1 is a schematic representation of the display system.

The display system illustrated in FIG. 1 is for use in providing a head-up display for the pilot of a military aircraft, but is equally applicable out of the specific context of military operations.

Referring to FIG. 1, a partially-transparent reflector 1, is mounted in front of the pilot within the cockpit of the aircraft and in his line-of-sight 2 through the aircraft-windscreen 3. A display of flight and weapon-aiming information is projected on the reflector 1 which is inclined to the line-of-sight 2 so that the pilot sees the display image in the reflector 2 against the background of the external scene through the windscreen 3. The display is projected from the screen 4 of a cathode-ray tube 5 by an optical system 6 that serves to focus the image seen by the pilot, substantially at infinity.

Figure 2:
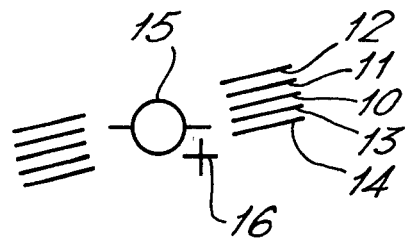
FIG. 2 is illustrative of symbology involved in the display provided by the system of FIG. 1.

The information displayed includes, as illustrated in FIG. 2, analogue presentation of aircraft attitude involving five pitch-bars 10 to 14 (each in the form of two spaced and aligned lines) and a flight-vector symbol 15 (in the form of a circle with short laterally-extending arms). The flight-vector symbol 15 remains stationary in the center of the screen 4 of the cathode-ray tube 5 and so its image remains stationary in the pilot's field of view through the reflector 1. The five pitch-bars 10 to 14 however move so as to be seen by the pilot to be displaced angularly, and also up and down, relative to the symbol 15, in accordance with bank and pitching movements respectively of the aircraft. The bars 10 to 14 remain parallel to one another and their movements on the screen 4 are regulated by reference to the vertical (established for example by a gyroscope or other attitude sensor in the aircraft) in such a way as to maintain them with the middle line 10 indicative of the the horizontal (zero pitch-angle), and the other four lines 11 to 14 above and below it at pitch-angle intervals of thirty degrees. The weapon-aiming information on the other hand, and as illustrated in FIG. 2, involves a cross symbol 16 that is moved in the display on the screen 4 so as to be seen by the pilot in image against the external scene through the windscreen 3, and to denote a desired line of aim of the aircraft weapon-system (or a selected part of it). The pilot's task is to manoeuvre the aircraft to bring the symbol 16 within the flight-vector symbol 15 and accordingly align the aircraft appropriately for firing of the weapon system.

The electric time-base and video signals required to produce the display of flight and weapon-aiming information on the screen 4, are supplied to the cathode-ray tube 5 by a waveform generator 17. The waveform generator 17 provides a raster time-base and generates the relevant video signals in accordance with signals it receives from appropriate attitude, and other, sensors 18, and a weapon-aiming, or other, computer 19. In this respect it is to be understood that the display generated, and as embodied in the video signals supplied to the cathode-ray rube 5, may embrace a wider variety of information than that involved in the simplified form illustrated in FIG. 2. Any of the information may be presented in digital or analogue form, or both. However in each case the information is displayed by brightness modulation of the cathode-ray-tube display-raster produced by the line and frame time-base signals that are applied to the deflection system of the tube by the waveform generator 17. The video signals required for different parts of the symbology (10 to 16) are derived separately in the waveform generator 17 and are then mixed together for application to the grid electrode of the cathode-ray tube 5, each signal being derived in accordance with the successive instants in the time-base raster at which bright-up is to occur to achieve a 'paint' of the relevant symbol, or symbol-group, in the appropriate position on the screen 4.

The video signals, consisting of a succession of bright-up pulses, required to produce the 'paint' of each symbol or symbol-group is derived in the waveform generator 17 from stored information that is sufficient to achieve a point-by-point mapping of the symbol or symbol-group on the screen 4 for a datum attitude — normally the wings-level attitude. Variation of the mapping to take account of variation in attitude of the aircraft is achieved in accordance with the aircraft pitch and bank angles. At each instant the line and frame time-bases define the point in the area of the display screen 4 to which the cathode-ray beam is directed. Thus it is possible by reference to the time-base signals, the stored information, and the measured pitch and bank angles to derive the video signals required to produce the mapping desired for any attitude.

The video signals might possibly be derived by first submitting the stored information to a transformation process in accordance with the pitch and bank angles, so as in this way to define a point-by-point mapping of the symbol or symbol-group special to the measured attitude. The bright-up pulses would then be derived from a comparison between this defined mapping and the point-by-point progression of the cathode-ray beam in accordance with the line and frame time-bases. However, considerable storage capacity would be required for retention of the result of the transformation process ready for point-by-point read out in accordance with the time-base signals. This is avoided with the system of the present invention, in which, in contrast, the video signals are derived by computing for each successive point of the screen 4 to which the cathode-ray beam is directed (in accordance with the progression of the line and frame time-bases), the corresponding point in the datum-attitude mapping. Direct read out of the appropriate bright-up pulse may then be made from the stored information relating to the zero-datum mapping. The whole of the display area is therefore effectively mapped back point-by-point through a transformation dependent on the aircraft attitude, to determine from comparison with the stored datum-attitude mapping which of the points of that area are to subject to bright up. The transformation process is conveniently performed incrementally.

Figure 3:
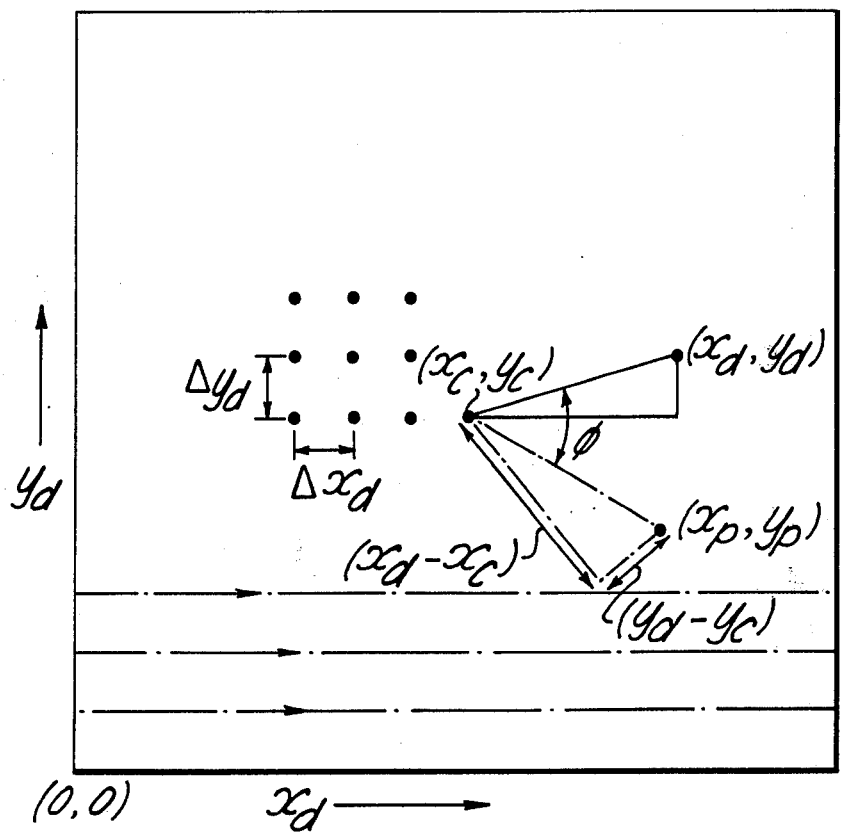
FIG. 3 is illustrative of raster scanning of the display area and certain relationships involved in the provision of the display of FIG. 2.

Referring to FIG. 3, the display picture on the screen 4 can be regarded as made up of a matrix of elementary areas that are defined by a series of points $(x_d, y_d)$ separated from one another by $\Delta x_d$ horizontally (direction of the line time-base deflection) and $\Delta y_d$ vertically (direction of the frame time-base deflection). The cathode-ray beam is scanned through these points in succession, scanning being regarded as starting from an origin (0, 0) and progressing horizontally in steps of $\Delta x_d$ keeping $y_d$ zero (that is to say, along the $x$-axis). When the initial horizontal scan is completed the cathode-ray beam is returned to the $y$-axis $(x_d = 0)$ to start the horizontal scan again, but with $y_d$ incremented by $\Delta y_d$. This process is repeated with $y_d$ being incremented by $\Delta y_d$ at the end of each scan, until the complete display area has been covered.

If each point $(x_d, y_d)$ of the area is treated as the mapping of a point $(x_p, y_p)$ of a datum-attitude picture after rotation of that picture through angle $\phi$ about a point $(x_c, y_c)$, then:

$$x_p = x_c + (x_d - x_c)\cos\phi + (y_d - y_c)\sin\phi$$

$$y_p = y_c - (x_d - x_c)\sin\phi + (y_d - y_c)\cos\phi$$

or $$x_p = [x_d\cos\phi + y_d\sin\phi] + [x_c - x_c\cos\phi - y_c\sin\phi]$$

$$y_p = [-x_d\sin\phi + y_d\cos\phi] + [y_c + x_c\sin\phi - y_c\cos\phi]$$

From these equations it can be shown that for movement from the point $(x_d, y_d)$ to the point $(x_d + \Delta x_d, y_d)$ in the horizontal scan of the cathode-ray beam, the corresponding movement in the datum-attitude map is given by:

$$x_p + \Delta x_p = x_p + \Delta x_d \cos\phi$$

$$y_p + \Delta y_p = y_p - \Delta x_d \sin\phi$$

Thus for each increment $\Delta x_d$ of horizontal scan the new coordinates in the datum-attitude map are obtained by addition of $\Delta x_d \cos\phi$ to the value of $x_p$ and by subtraction of $\Delta x_d \sin\phi$ from the value of $y_p$.

Similarly it can be shown that for movement from the point $(x_d, y_d)$ to the point $(x_d, y_d + \Delta y_d)$ in the vertical scan, the corresponding movement in the datum attitude map is given by:

$$x_p + \Delta x_p = x_p + \Delta y_d \sin\phi$$

$$y_p + \Delta y_p = y_p + \Delta y_d \cos\phi$$

Thus for each increment $\Delta y_d$ of the vertical scan the new coordinates in the datum-attitude map are obtained by addition of $\Delta y_d \sin\phi$ to the value of $x_p$ and of $\Delta y_d \cos\phi$ to the value of $y_p$.

The principles of the above consideration are applied to the generation of the video signals required for the display of FIG. 2. More particularly they are applied in relation to transformation of the symbology in rotation, required upon bank (angle $\phi$) of the aircraft. Transformation in translation required upon change of pitch attitude, is applied in accordance with computation of appropriate linear shifts.

Figure 4:
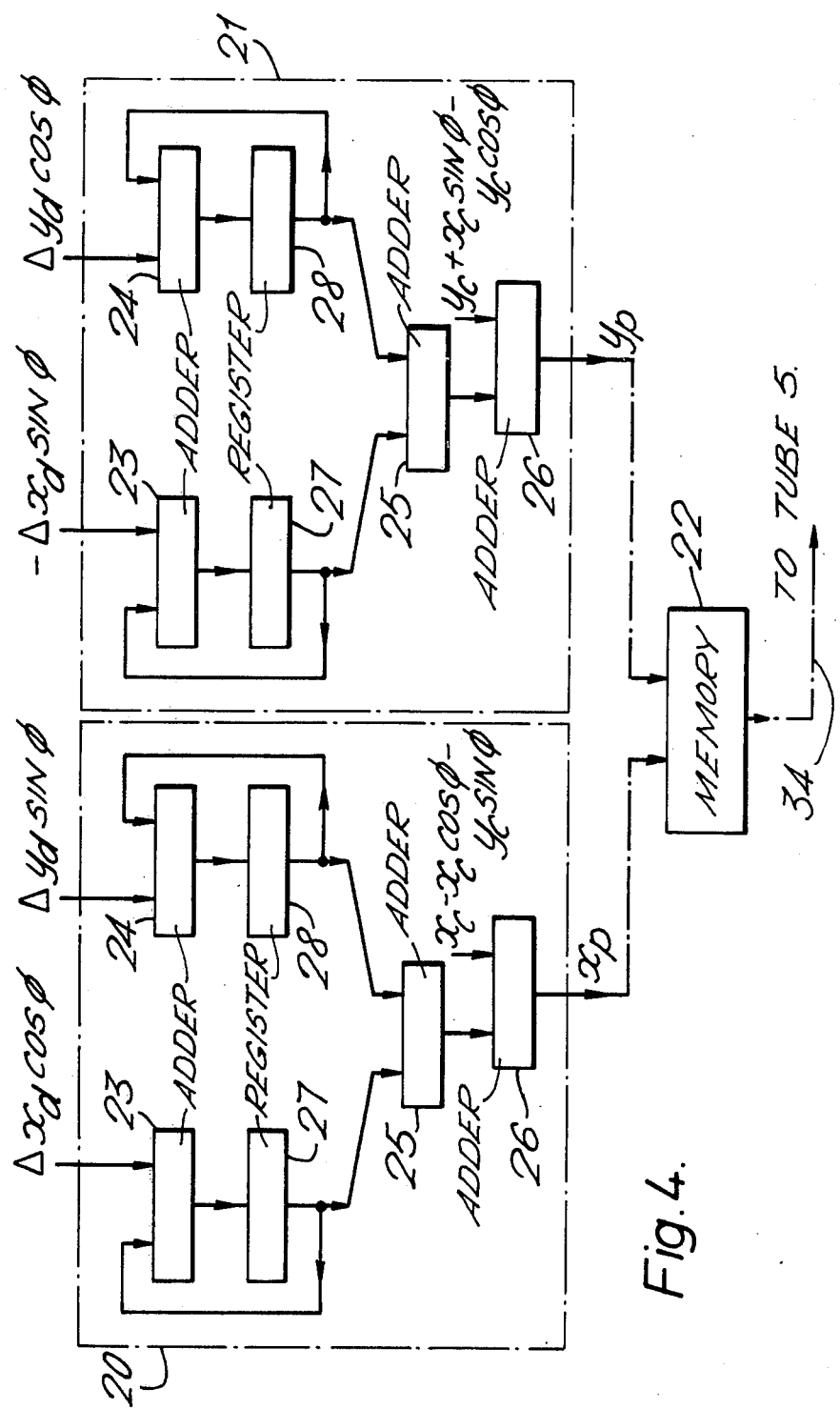
FIG. 4 is a schematic representation of electrical units used in the generation of video signals required in the provision of the display of FIG. 2.

Equipment which is incorporated in the waveform generator 17 and is effective to generate the video signal required for display of the group of pitch-bar symbols 10 to 14 of FIG. 2 is illustrated in FIG. 4. The operation of this equipment in respect of variation of bank angle $\phi$ alone, will be described.

Referring to FIG. 4, two computing units 20 and 21 that serve to compute the instantaneous values of $x_p$ and $y_p$ supply signals in accordance with these values to address a memory 22. The memory 22 stores binary information as to point-by-point constitution of the pitch-bar symbology appropriate to the wings-level, or some other datum, attitude of the aircraft. A bright-up pulse is issued from the memory to the cathode-ray tube according to whether a '1' or '0' is stored at the identified address, that is to say according to whether the point $(x_p, y_p)$ in the datum-attitude picture is bright or dark. (Clearly it would be possible to store more information at each location; for example, information as to color may be stored and conveyed to the cathode-ray tube, if in any case it is desired to provide a color picture to the pilot with the symbols, or different parts of them, differentiated from one another by color).

Each computing unit 20 and 21 comprises four adders 23 to 26, and two registers 27 and 28 each of which is connected to receive the output of a respective one of the adders 23 and 24 and to provide feedback of the register content to that one adder. The adder 23 of the unit 20 is supplied from outside that unit with a signal representative of the product of $\Delta x_d$ (normally constant) and $\cos\phi$, whereas that of the unit 21 is correspondingly supplied with a signal representative of $-\Delta x_d \sin\phi$. The adders 24 of the units 20 and 21 are, on the other hand, supplied from outside those units with signals representative of $\Delta y_d \sin\phi$ and $\Delta y_d \cos\phi$ respectively. These four signals externally-supplied to the adders 23 and 24 in the two units 20 and 21 are supplied, as illustrated in FIG. 5, from a unit 30 within the generator 17, which generates these incremental signals in accordance with the bank angle $\phi$ and the incremental changes corresponding to $\Delta x_d$ and $\Delta y_d$ respectively, of the line and frame time-base waveforms generated by the time-base generating unit 31 of the waveform generator 17. The incremental-signals generating unit 30 computes the values of $\sin\phi$ and $\cos\phi$ from the attitude information signalled from the sensors 18, and emits the incremental signals appropriately in accordance with the progression of the time-base waveforms applied to the cathode-ray tube 5 from the time-base generating unit 31 via leads 32 and 33.

Referring again more particularly to FIG. 4, the registers 27 and 28 of the unit 20 accumulate the values of $x_d \cos\phi$ and $y_d \sin\phi$ respectively, and those of the unit 21, the values of $-x_d \sin\phi$ and $y_d \cos\phi$ respectively. The sum of the two values accumulated in each unit 20 and 21 is derived by the adder 25 of that unit, and the instantaneous values of $x_p$ and $y_p$ for addressing the memory 22 are then derived in the adders 26 of the two units 20 and 21. In the unit 20 the output of the adder 25 is added by the adder 26 to a computed value of:

$$x_c - x_c\cos\phi - y_c\sin\phi \quad (1)$$

whereas in the unit 21 the output of the adder 25 is added in the adder 26 to a computed value of:

$$y_c + x_c\sin\phi - y_c\cos\phi \quad (2)$$

Signals in accordance with these computed values are supplied to the units 20 and 21 from the unit 30 (FIG. 5) in accordance with settings of values of $x_c$ and $y_c$, and the values of $\sin\phi$ and $\cos\phi$ computed as referred to above from the attitude information signalled from the sensors 18.

Initially in the scanning raster, with the cathode-ray beam directed at the origin (0, 0), the registers 27 and 28 in both units 20 and 21 are set to zero. The values of $x_p$ and $y_p$ generated are then equal to the values of functions (1) and (2), and as the cathode-ray beam is scanned across the screen 4 an increment $\Delta x_d \cos\phi$ is added to $x_p$ and $\Delta x_d \sin\phi$ is subtracted from $y_p$ via adders 23 in units 20 and 21. At the end of each line-scan the registers 27 are reset to zero, and increments $\Delta y_d \sin\phi$ in $x_p$, and $\Delta y_d \cos\phi$ in $y_p$ are added in via the adders 24 of the units 20 and 21 respectively. At the end of each frame scan, all registers 27 and 28 are reset to zero.

Thus as the cathode-ray beam progresses through the raster scan, so its location at successive instants is transferred back to derive, point by point, the coordinates $(x_p, y_p)$ of the beam location with respect to the datum-attitude mapping. These coordinates are used to address the memory 22 and thereby read out the appropriate bright-up information relating to the beam location, for application to the cathode-ray tube 5 via a lead 34.

Although the signals derived by the units 20 and 21 may be used in the display system to address the memory 22 directly, and the signals read out may be applied directly to the cathode-ray tube 5 via the lead 34 (all as illustrated in broken line in FIG. 4), the alternative system-configuration of FIG. 5 may be utilized instead in order to achieve improved visual effect in the display produced. In this respect, the system-configuration illustrated in FIG. 5 is effective to overcome, or at least substantially reduce, the problem of variation of visual definition with line slope, that is experienced generally with raster-scan display of symbology.

Without the specific techniques that are embodied in the system-configuration of FIG. 5 to counteract variation of visual definition with line slope, lines such as the pitch bars 10 to 14 are clear when horizontal, or more precisely, when aligned with the raster-scanning, but lose definition when tilted out of such alignment. Display of each line is in essence generated by bright up of successive elementary areas across the picture, and whereas these areas in the untilted line are joined up with one another in one series along one or more scan lines, the tilted line is formed by disjointed series on successive, vertically-spaced scan lines of the raster. There is loss of definition of the line in the display picture on the screen 4 since, as illustrated (to an exaggerated extent) in FIG. 6 for the case of tilted line L, the viewed image is disjointed and of a staircase or notched form. The staircase effect is more pronounced the smaller the angle of tilt, and slight change of this angle can readily result in disconcerting movement and even oscillatory, back-and-forth break up, between successive sections of the line representation.

A significant increase in the number of line scans in the raster together with a corresponding increase in the definition with which the display symbology is generated, would serve to reduce the visual staircase or notched effect. These measures reduce the size of the elementary areas of bright up, but increase substantially the amount of picture information it is necessary to store and process during operation. Furthermore there is usually in practice a standard raster to be used (for example, 512- or 625-line), and an economic or space limit on the amount of information storage and processing that can be provided. Within the context of these limitations reduction of the visual staircase or notched effect could only be achieved by confining bright up to fractional parts of certain of the elementary picture-areas where there is transition from one scan line to the next between successive sections of the tilted-line representation. Such fractional bright-up cannot be achieved easily, but an approximation to it towards the same end, is achieved according to this invention in the present system illustrated in FIG. 5, by modulating the brightness of each of the relevant elementary areas in accordance with the fractional part that would, ideally, have been fully brighted up.

Referring to FIG. 5, the instantaneous values of $x_p$ and $y_p$ computed by the units 20 and 21 are utilized in the system to address the memory 22 via an addressing unit 35. The memory 22 stores binary information relating to a 256 × 256 matrix division of the pitch-bar symbology appropriate to the wings-level attitude of the aircraft. In this datum attitude the pitch-bar symbols lie parallel to the line scan within the cathode-ray-tube picture, and therefore have the most advantageous orientation for clear-cut reproduction. The information stored in the memory 22 relates to the brightness within the datum-attitude picture of each of the 256 × 256 elementary areas defined by the matrix division, and a four-bit word is read out from the memory 22 in relation to each specific point $(x_p, y_p)$ identified from the computing units 20 and 21. In this connection, however, the values of $x_p$ and $y_p$ are computed by the units 20 and 21 as two binary numbers of eleven bits each, but it is only those signals representative of the first, most significant, eight bits of each of these numbers that are selected by the unit 35 for addressing the memory 22. The signals representative of the remaining, least-significant, three bits of each computed number are selected by an amplifier-gating unit 36 for application to each of four read-only memory units 37 to 40. The four units 37 to 40 are supplied with the four bits respectively of the four-bit word read out from the memory 22 on leads 22A to 22D.

Figure 7:
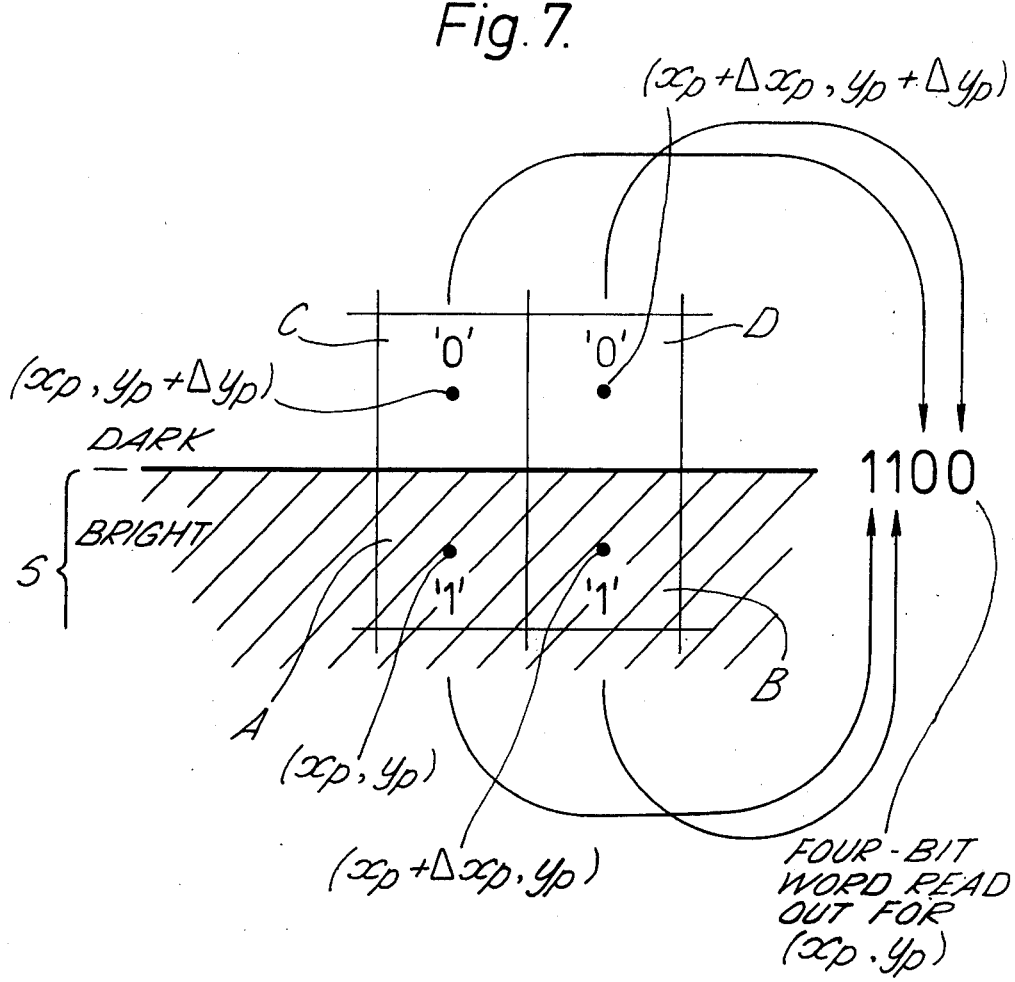
FIGS. 7 and 8 serve to illustrate principles involved in operation of the circuitry of FIG. 4.

The four-bit word read out from the memory 22 in respect to the computed point $(x_p, y_p)$ relates to the brightness at that point and at three adjacent points in the datum-attitude picture. More particularly, and as illustrated in FIG. 7 in relation to a point $(x_p, y_p)$ situated just within a bright pitch-bar symbol S of the datum-attitude picture, the bit — illustrated as '1', signifying light (in contrast to '0' for dark) — read out on the lead 22A, defines the brightness of an elementary area A centered on the identified point $(x_p, y_p)$. Another bit — '1' in this illustration — is read out on the lead 22B to define the brightness of an elementary area B centered on the next point, $(x_p+\Delta x_p, y_p)$ along the same datum-attitude scan-line. The remaining two bits — both '0' in this illustration — are read out on the leads 22C and 22D to define the brightness of elementary areas C and D, respectively, centered on the points $(x_p, y_p+\Delta y_p)$ and $(x_p+\Delta x_p, y_p+\Delta y_p)$ and corresponding to the areas A and B in the next succeeding scan-line of the datum-attitude picture.

The elementary areas in the matrix division of the display screen 4 do not in general map precisely into the elementary areas of the datum-attitude picture. The extent to which the angle $\phi$ differs from zero, that is to say the extent to which there is departure from the datum pitch-attitude, determines the degree of the misfit. Accordingly the center point $(x_d, y_d)$ of the elementary area H, say, of the display picture (FIG. 6) on the cathode-ray-tube screen 4 will not in general map back accurately onto the corresponding center-point $(x_p, y_p)$ of the datum-attitude picture. In the present case, where the values of $x_p$ and $y_p$ are both computed with high resolution to 11 bits, the most significant eight bits of each are alone sufficient to identify the appropriate center-point $(x_p, y_p)$; the other three least-significant bits of each are commensurate with the degree of misfit.

Figure 8:
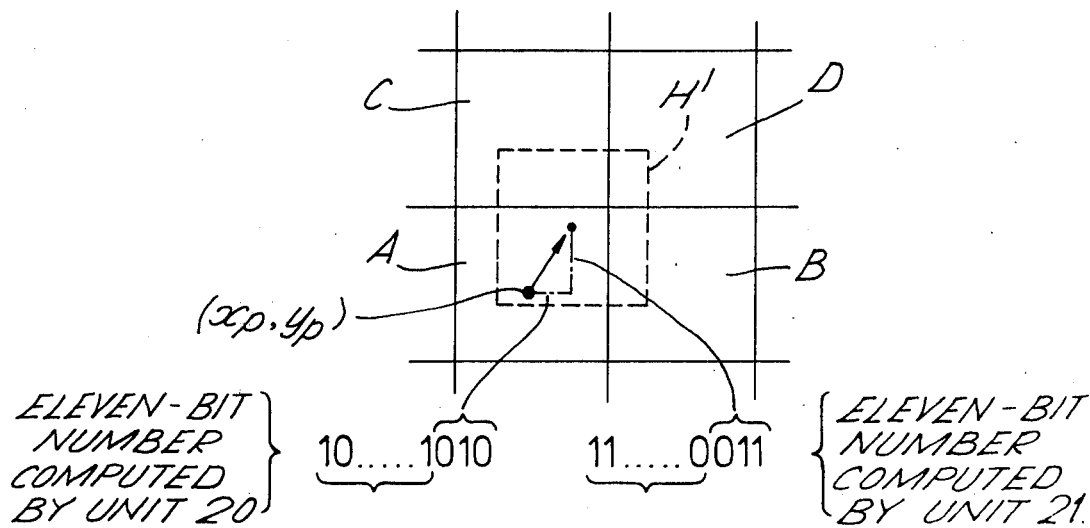

Thus, as illustrated in FIG. 8, the most-significant eight bits of each of the numbers computed by the units 20 and 21 are effective to identify the mapping of the elementary area H centered on the point $(x_d, y_d)$ of the display picture (FIG. 6) on the screen 4, with the elementary area A centered on the point $(x_p, y_p)$. However, the two words formed by the last three bits — the 'underflow' bits — of each of these two numbers give indication of the extent to which use of the higher degree of resolution (11 bits rather than eight) would have the effect of displacing the mapping, H', of area H into the datum-attitude picture, out of exact fit with the area A, so as, in general, to overlap each of the adjoining areas B, C and D. On this latter basis therefore, the area H on the display screen 4 would more appropriately take the brightness of area A only within the part of its mapping, H', that remains within the compass of area A. Remaining parts of the area H would ideally take the brightness of whichever of the areas B, C and D are overlapped by them in the mapping H'. Differential variation of brightness of this nature throughout the area H is not readily possible, but in accordance with the present invention very much the same visual effect is achieved by regulating the extent of bright up of the whole of the area H within the display picture in accordance with weighted components of the brightness of area A and each adjoining area B, C and D. The weighting applied in each case is dependent on the extent of overlap of the area H' with the relevant area A, B, C or D. The two three-bit 'underflow' words provide a measure in each case of this extent of areal overlap.

The brightness weightings appropriate to any identified elementary area (A) of the datum-attitude picture for all different combinations of the two three-bit 'underflow' words, are stored in the read-only memory unit 37, whereas the corresponding weightings individual to the three adjoining elementary-areas (B, C and D) are stored respectively, in the read-only memory units 38, 39 and 40. A four-bit word is signalled from each individual memory unit 37 to 40 if the digit signalled to it via the associated lead 22A to 22D is '1'. The particular word signalled in each case is in accordance with the value of weighting stored in respect of the particular combination of two three-bit words signalled from the unit 36. Thus, words in accordance with the appropriate brightness contributions from the identified area (A) and the three adjoining areas (B, C and D) are supplied from the memory units 37 to 40. These words are added together in a unit 41 to produce a four-bit sum that is then converted within the unit 41 to an output pulse having a voltage amplitude in accordance with that sum. This amplitude-modulated pulse is supplied as a bright-up pulse to the grid of the cathode-ray tube 5 via the lead 34 from the waveform generator 17. The consequent degree of bright up of the elementary display area (H) defined on the screen 4 by the line and frame time-bases at that instant, is dependent on the amplitude of the supplied pulse. (With the particular example illustrated in FIG. 7 where the areas A and B are bright but areas C and D are dark, the combined pulse would have an amplitude dependent upon, and the consequent bright up of the display of the defined area (H) would be in accordance with, the fractional part of the total area of its datum-attitude mapping (H') that overlaps the bright areas A and B). The degree of bright up is accordingly regulated by virtue of the transformations effected by the computing units 20 and 21, to give a general visual effect appropriate to the departure from the datum-attitude picture-composition stored in the memory 22. The discontinuities that in normal circumstances give rise to the staircase or notched appearance are to a substantial extent smoothed out as far as the viewing eye is concerned, by this brightness modulation.

The normally-experienced staircase or notched effect is especially noticeable where slightly-inclined lines such as the pitch bars 10 to 14, are involved, but it applies also to a greater or lesser extent in other symbology. The same smoothing out effect to the eye can be obtained in such cases using brightness-modulation techniques corresponding to those used in the equipment of FIG. 5. In any particular case the degree of bright-up of each successive elementary area (H) is not necessarily linearly related to the areal overlap or misfit of its mapping (H') in the datum-attitude picture; in normal circumstances the relationship, and therefore the stored brightness-weightings used, will be preferably non-linearly dependent on the misfit, and will be a matter for choice in achieving the best visual effect.

Whereas the memory 22 may store picture information concerning each individual line or other symbol-element of a family of such elements in the desired display, it may alternatively store information sufficient only to define a single line or other element, together with information as to the spacing and orientation of the individual members of the family from this. For example, picture information concerning a single line of the family of pitch-bars 10 to 14 may be stored together with appropriate information concerning the spacing ($y$-shifts) of the individual members of the family from this so that the whole family of bars 10 to 14 may be constructed.

The use of the raster scan and the derivation of symbology in accordance with such scan enables pictures derived by a television or infra-red camera to be readily combined with the video signals supplied to the tube 5 by the waveform generator 17. Such cameras conventionally utilise a raster scan and the provision of the symbology video-signals to the same scan (rather than by means of cursive techniques) has the advantage of avoiding need for any form of scan conversion in the display system. The television or infra-red camera may for example view the same external scene as viewed by the pilot, or which but for lack of visibility would be viewed by him, along the line-of-sight 2, the camera-derived signals being used to produce on the screen 4 a picture of the scene which appears in the reflector 3 superimposed exactly on itself in the external world.

Although the system described above uses a cathode-ray tube, other forms of display device may be used. In particular a matrix-display device may be used, the modulated signals being applied to the device as successive 'cross-points' of the matrix are selected for operation in turn throughout the point-by-point scan of the display area.

I claim:

1. In a display system in which a display image is provided in a display area of a display device in accordance with modulation of signals that are synchronized to point-by-point scanning of the said display area, the modulated signals being derived in accordance with stored information which is read out from memory means and which relates to the mapping of the image within the display area, and in which the disposition of the image within the display area is varied from a datum defined by the stored information in dependence upon an input variable angle $\phi$, said system including means to perform a transformation process dependent upon the said input angle $\phi$ to identify in respect of each successive point $(x_d, y_d)$ of said scan the corresponding point $(x_p, y_p)$ in the stored datum-mapping, the improvement wherein said transformation means comprises means to derive distinct first and second signals in accordance respectively with $x_d\cos\phi$ and $y_d\sin\phi$, means to derive distinct third and fourth signals in accordance respectively with $-x_d\sin\phi$ and $y_d\cos\phi$, first adder means for adding said first and second signals together to compute the instantaneous value of $x_p$, said second adder means for adding said third and fourth signals together to compute the instantaneous value of $y_p$, said system including means responsive to said computed values of $x_p$ and $y_p$ to read out from said memory means information stored thereby in respect to the point $(x_p, y_p)$ of the stored datum-mapping.

2. A system according to claim 1, including means to derive a fifth signal dependent on $(x_c\cos\phi + y_c\sin\phi)$, where $x_c$ and $y_c$ have predetermined values, and means to derive a sixth signal dependent on $(x_c\sin\phi - y_c\cos\phi)$, said first adder means including means to add said fifth signal to said first and second signals for the said computation of said instantaneous value of $x_p$, and said second adder means including means to add said sixth signal to said third and fourth signals for the said computation of said instantaneous value of $y_p$.

3. A system according to claim 1 including brightness-control means for controlling brightness of said display, said brightness-control means including means responsive to said computed values of $x_p$ and $y_p$ to derive brightness-weighting values in accordance therewith, means for weighting said information read out from said memory means in accordance with said brightness-weighting values, and means for varying said brightness in dependence upon said weighted information.

4. A system according to claim 3 wherein said values of $x_p$ and $y_p$ are computed as multi-digit numbers, and wherein said means for deriving said brightness-weighting values is means to derive said brightness-weighting values in accordance with least-significant digits of said multi-digit numbers.

5. A system according to claim 3, wherein said display device is a cathode-ray tube, said system including means to apply signals in accordance with said weighted information to the cathode-ray tube to modulate the brightness of the display area point by point.

6. A display system for use in a craft, comprising: display means which provides a display area and which is operative to provide point-by-point scanning of said area, said display means being responsive to modulated signals applied thereto to provide a display image in said area with a mapping therein dependent on the modulation of the applied signals and their synchronization with said scan; memory means for storing information relating to a mapping of the image within said display area corresponding to a datum attitude of the craft; transformation means responsive to change of attitude angle $\phi$ of said craft from the datum attitude to perform a transformation process dependent on said change for mapping each successive point $(x_d, y_d)$ of the display area through said scan into the datum-attitude mapping so as to identify the corresponding point $(x_p, y_p)$ of the datum-attitude mapping, said transformation means comprising means to derive distinct first and second signals in accordance respectively with $x_d\cos\phi$ and $y_d\sin\phi$, means to derive distinct third and fourth signals in accordance respectively with $-x_d\sin\phi$ and $y_d\cos\phi$, first adder means for adding said first and second signals together to compute the instantaneous value of $x_p$, and second adder means for adding said third and fourth signals together to compute the instantaneous value of $y_p$; means responsive to the computed values of $x_p$ and $y_p$ to derive from the memory means signals modulated in accordance with the information stored in respect of each successively-identified point $(x_p, y_p)$; and means for applying the said derived signals to said display means to provide display of said display image with disposition in said display area appropriate to said attitude change of the craft.

7. In a method for providing a display of symbology by selective bright up of successively-scanned elements of a display area, the bright-up applied to each said element being dependent on input signals defining those of the said elements which are to be occupied by said symbology, the improvement wherein the degree of bright-up applied in each individual one of said elements is varied in dependence upon the extent to which the symbology as defined by said signals is to occupy that element.

8. In a display system for displaying symbology, comprising display means having a display area provided by a multiplicity of separately-energizable display elements, means to derive signals dependent on said symbology, and means responsive to said signals to energize said elements selectively for mapping said symbology in display into said area, the improvement wherein said means for energizing said elements includes means responsive to said signals to derive in respect of each said element a signal weighted in dependence upon the areal extent to which that element is to be occupied by the said symbology in the said mapping, and means for energizing each said element in accordance with the weighted signal derived in respect thereof.

9. A display system for displaying symbology comprising: display means providing a display area and operative to scan successive elements of said area according to raster line-scanning thereof, said display means being responsive to signals applied thereto to provide a display image in said area by selective bright-up of the scanned elements according to respective ones of said signals; means to define a desired mapping of said symbology in said area; signal-generating means responsive to said defined mapping to generate video signals related respectively to the said elements, each said video signal having a value dependent on the areal extent to which the said desired mapping overlies the respective element; and means for applying the said video signals to said display means to provide bright-up each said element in accordance with the said value of its respectively-related video signal.

10. A display system according to claim 9 wherein said display means includes a cathode-ray tube, and means for supplying raster-scan signals to said cathode-ray tube.

11. A display system according to claim 9 including means defining a datum mapping of said symbology, means to supply first signals dependent on the extent to which said desired mapping varies from said datum mapping, means responsive to said first signals to derive weightings dependent on the extent of said variation from the datum mapping, means to derive in dependence upon said first signals second signals modulated in accordance with said desired mapping, and means to derive said video signals in dependence upon said second signals modified in accordance with said weightings.

12. A display system for providing a display of symbology, comprising: display means providing a display area and operative to scan successive elements of said area, said display means being responsive to modulated signals applied thereto to provide a display image in said area with a mapping therein dependent on the modulation of the applied signals and their synchronization with said scan; memory means for storing information relating to a datum-attitude mapping of the symbology within said display area; means responsive to signalled attitude change to perform a transformation process dependent on said change for mapping the display area element by element through said scan into the datum-attitude mapping so as to derive values identifying respectively the corresponding elements of the datum-attitude mapping; means to derive from the memory means signals modulated in accordance with the information stored in respect of the successively identified elements; means responsive to the results of said transformation process to derive brightness weightings applicable to the said scan elements, the said brightness weighting applicable to each individual scan element being generated in accordance with the said identifying value derived in respect to the corresponding datum-attitude element; and means for applying the modulated signals to the said display means modified in accordance with said weightings so as to provide display of said symbology with disposition in said display area appropriate to said signalled attitude-change.

13. A display system according to claim 12 wherein said means for performing said transformation process includes means to derive said identifying values as multi-digit numbers, and wherein said means to derive said brightness weightings is means to derive said weightings in accordance with the values of lesser significant digits of the respective multi-digit numbers.

14. A display system according to claim 12 including means for reading out from said memory means in respect of each said identified element a first signal in accordance with the brightness in the datum-attitude mapping of said identified element, together with at least one other signal in accordance with the brightness in the datum attitude mapping of an element therein immediately adjoining said identified element, means for applying brightness weightings to both said first and other signals read out in respect of each said identified element, the brightness weightings applied in each case being dependent on the identifying value derived in respect of the respective identified element, and means for supplying to said display device in respect of each said identified element a video signal modulated in accordance with combination of the said first and other signals derived in respect of that identified element.

* * * * *

UNITED STATES PATENT AND TRADEMARK OFFICE
CERTIFICATE OF CORRECTION

PATENT NO. : 4,127,850
DATED : November 28, 1978
INVENTOR(S) : David J. Vallins

It is certified that error appears in the above—identified patent and that said Letters Patent are hereby corrected as shown below:

[30]  Foreign Application Priority Data

Sep. 3, 1976 [GB] United Kingdom. . . . . . . . . 36668/76

Oct. 3, 1974 [GB] United Kingdom. . . . . . . . . 43022/74

Signed and Sealed this

Tenth Day of April 1979

[SEAL]

Attest:

RUTH C. MASON
Attesting Officer

DONALD W. BANNER
Commissioner of Patents and Trademarks